(12) United States Patent
Murray (10) Patent No.: US 8,983,067 B2
(45) Date of Patent: Mar. 17, 2015

(54) CRYPTOGRAPHIC CIRCUIT AND METHOD THEREFOR

(75) Inventor: Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 107 days.

(21) Appl. No.: 13/211,878

(22) Filed: Aug. 17, 2011

(65) Prior Publication Data

US 2013/0044874 A1 Feb. 21, 2013

(51) Int. Cl.
| | |
|---|---|
| H04L 9/00 | (2006.01) |
| H04L 9/32 | (2006.01) |
| H04L 9/08 | (2006.01) |
| H04N 21/266 | (2011.01) |
| H04N 21/418 | (2011.01) |
| H04N 21/4623 | (2011.01) |

(52) U.S. Cl.
CPC ............ *H04L 9/3278* (2013.01); *H04L 9/0866* (2013.01); *H04N 21/26613* (2013.01); *H04N 21/4181* (2013.01); *H04N 21/4623* (2013.01); *H04L 2209/60* (2013.01)
USPC .......................................................... 380/44

(58) Field of Classification Search
USPC .......................................................... 380/44
See application file for complete search history.

(56) References Cited

U.S. PATENT DOCUMENTS

| | | | | |
|---|---|---|---|---|
| 6,907,123 | B1 * | 6/2005 | Schier | 380/28 |
| 7,716,497 | B1 * | 5/2010 | Trimberger | 713/193 |
| 8,667,265 | B1 * | 3/2014 | Hamlet et al. | 713/150 |
| 2004/0230540 | A1 * | 11/2004 | Crane et al. | 705/76 |
| 2005/0033974 | A1 * | 2/2005 | Ansell et al. | 713/193 |
| 2005/0157880 | A1 * | 7/2005 | Kurn et al. | 380/279 |
| 2006/0210082 | A1 * | 9/2006 | Devadas et al. | 380/277 |
| 2007/0258585 | A1 * | 11/2007 | Sandhu et al. | 380/44 |
| 2008/0256600 | A1 | 10/2008 | Schrijen et al. | |
| 2008/0279373 | A1 | 11/2008 | Erhart et al. | |
| 2009/0327747 | A1 * | 12/2009 | Bruekers et al. | 713/189 |
| 2011/0002461 | A1 * | 1/2011 | Erhart et al. | 380/44 |
| 2011/0191837 | A1 * | 8/2011 | Guajardo Merchan et al. | 726/6 |
| 2013/0051552 | A1 * | 2/2013 | Handschuh et al. | 380/44 |
| 2013/0142329 | A1 * | 6/2013 | Bell et al. | 380/44 |

FOREIGN PATENT DOCUMENTS

| | | |
|---|---|---|
| EP | 2 326 043 A1 | 5/2011 |
| EP | 2326043 A1 | 5/2011 |
| WO | 2006/053304 A2 | 5/2006 |
| WO | 2006053304 A2 | 5/2006 |

OTHER PUBLICATIONS

Tuyls, Pim et al. "Read-Proof Hardware from Protective Coatings," Oct. 10-13, 2006, Proceedings of the 8th international conference on Cryptographic Hardware and Embedded Systems.*

(Continued)

*Primary Examiner* — Darren B Schwartz (57) ABSTRACT

Data security is facilitated. In accordance with one or more embodiments, a target circuit is used to generate encryption information specific to the target circuit. The encryption information is used for generating data corresponding to a key, such as for decrypting media content. In some implementations, encryption information is used together with key data to generate a key offset. The key offset is subsequently used, together with newly-generated encryption information, to obtain the key.

12 Claims, 5 Drawing Sheets

(56) References Cited

OTHER PUBLICATIONS

Devadas, S. et al. "Design and Implementation of PUF-Based "Uclonable" RFID ICs for Anti-Counterfeiting and Security Applications", IEEE International Conference on RFID, pp. 58-64 (Apr. 2008).

Extended European Search Report for Patent Appln. No. 12180838.0 (Mar. 27, 2014).

Tuyls, P. et al. "Read-Proof Hardware from Protective Coatings", Cryptographic Hardware and Embedded Systems, Lecture Notes in Computer Science, vol. 4249, pp. 369-383 (2006).

\* cited by examiner

PERSONALISATION

FIG. 4A

USAGE

CRYPTOGRAPHIC CIRCUIT AND METHOD THEREFOR

Many media content systems employ encryption or other approaches to protect media content. In many applications, content delivery is provided according to a subscription-based service. For example, subscription-based media systems, such as pay TV systems, often encrypt analogue or digital media signals to be provided to users. The encrypted content may be accessed using a key hierarchy, which is strongly detained by the end-product architecture.

Decryption is often carried out using a decoder box that uses a removable smart card in order to provide "renewability" of the conditional access system (i.e., if the system is compromised, encryption algorithms and other information can be changed by the operator simply by changing the smart card without necessarily changing the decoder box). Because of this architecture, and the generally insecure architecture of many decoder boxes, the interface between the smartcard and the decoder box itself is a vulnerable point.

The vulnerability of smartcard type systems can be mitigated by making sure that it carries an encryption key with a short lifetime. For example, in certain conditional access systems, this interface carries so-called control words (CW), which act as key-generating material for content encryption, and generally have a short lifetime (e.g., 10 seconds). The control words are delivered to each decoder box (e.g., within packets called ECM (Entitlement Checking Messages)), which are often the same for many or all subscribers, and contain an encrypted version of the control words, with the encryption being performed under a key known as the "Service Key." The Service Key, which is often valid for a longer time period (e.g., a month) relates to a specific service (e.g., a specific movie channel), so that all subscribers entitled to receive a specific service require access to a relevant Service Key, which can be stored in the smartcard. Multiple services can be transmitted within a common multiplex. Access to the SK is granted to individual subscribers (or groups of subscribers) by sending them Entitlement Checking Messages. These packets are encrypted using one or more keys stored on the card itself; these so-called Card Keys are programmed into the card during a "personalization phase" before it is issued to a subscriber, and are stored for use when a packet has to addressed to a particular subscriber.

For broadcast systems with large numbers of subscribers (e.g., a large pay-TV system), the transmission bandwidth required to send individual packets to every subscriber when service keys are updated can be prohibitive. Situations can also arise when a non-paying subscriber or, more seriously, multiple instances of a cloned smartcard need to be revoked. When a new Service Key needs to be issued to a large number subscribers, significant bandwidth can be required. While various approaches have been implemented to mitigate such distribution burdens, they continue to present challenges.

Various example embodiments are directed to cryptographic and other security circuits, such as those used in media security circuits and approaches, and to addressing various challenges including those discussed above.

According to an example embodiment, an apparatus includes a target circuit and a data-generation circuit. The target circuit generates an output indicative of a distinctive manufacturing-based signature that identifies the target circuit. The data-generation circuit generates an offset based at least partly on an output that is generated by the target circuit, the output being indicative of the distinctive manufacturing-based signature. The data-generation circuit further uses the offset and another output that is generated by the target circuit, the other output being indicative of the distinctive manufacturing-based signature, to generate data that corresponds to a cryptographic key used to generate the offset.

Another example embodiment is directed to a method for communicating with a media decoding device. At a physically unclonable function (PUF) circuit, an output is generated, the output being indicative of an unclonable characteristic of the PUF circuit. In response to an initialization command, the PUF circuit is used to generate an output, a key offset is generated using the output of the PUF circuit and a key provided to the cryptographic circuit, and the key offset is stored in a memory circuit. After storing the key offset, the PUF circuit is operated to generate a new output, the new output is used with the stored key offset to obtain the key, and the key is used to facilitate the decryption of media content at the media decoding device.

Another example embodiment is directed to a media access system including a media decoding device that receives and decrypts an encrypted media stream, and a media access card that facilitates the decryption. The media access card includes a communication interface that communicates with the media decoding device, a physically unclonable function (PUF) circuit, a memory circuit, and a cryptographic circuit. The PUF circuit generates an output indicative of an unclonable characteristic of the PUF circuit. The cryptographic circuit is responsive to an initialization command by controlling the PUF circuit to generate an output, generating a key offset using the output of the PUF circuit and a key provided to the cryptographic circuit, and storing the key offset in the memory circuit. After storing the key offset, the cryptographic circuit erases the key provided to the cryptographic circuit, operates the PUF circuit to generate a new output, uses the new output with the stored key offset to obtain the key, and uses the obtained key to facilitate the decryption of media content at the media decoding device.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for and/or involving security. While the present invention is not necessarily limited in this context, various aspects of the invention may be appreciated through a discussion of related examples.

In accordance with various example embodiments, a media circuit mitigates access, such as for cloning of access information and/or access circuits, for one or more of a variety of applications. In some implementations, physically unclonable functions (PUFs) are used within access devices such as smartcards, to make the smartcards resistant to attack scenarios such as those encountered in subscription-based media content delivery, such as in satellite, cable and other pay-TV markets (e.g., cloning of cards used in set-top boxes).

As discussed herein, a PUF circuit refers to a circuit that makes use of variations present in similar circuits as may be relevant, for example, to variations in manufacturing processes (e.g., the semi-random inclusion and/or distribution of atoms and molecules). These variations render each circuit separately identifiable as relative to other circuits manufactured using the same process. In this context, characteristics of the PUF circuit as relative to these variations may be considered to be a signature, or fingerprint type aspect of the circuit that can be used to identify the circuit as being unique, and otherwise used in authentication/cryptographic type functions as discussed herein.

In various embodiments, a target circuit, such as a PUF circuit, generates an output indicative of a distinctive manufacturing-based signature that identifies the target circuit. This significance may, for example, relate to a circuit that is manufactured with the same components as the target circuit, with the same process as the target circuit, or both. Differences in manufacturing can be used to differentiate a re-made target circuit (e.g., when the circuit is attempted to be copied) from the original target circuit.

In various embodiments, subscriber-specific keys employ a PUF and are presented in a smartcard only for a very short period of time and at an unpredictable point in time. With this approach, card keys are not stored permanently within the card, but instead in a form which makes them usable only in combination with access to the PUF.

Other aspects of the present invention are directed to independently switching PUF function power within a smartcard. This approach facilitates control within the smartcard, thus avoiding reliance on design features within a decoder box (e.g., as related to power-down) and ensuring that the PUF is immediately employed at the required time. For example, the PUF can be re-initialized when an entitlement-checking (or entitlement-management) packet (e.g., an EMM packet) intended for a specific smartcard is received, such as by using a switch in the power line of circuitry associated with SRAM, flip-flops or other physical elements used to realize the PUF.

In accordance with another example embodiment, PUF-derived secret information is used to recover various card keys used within a key management system in use. After the card keys are recovered, these data items are erased so that they persist within the smartcard for a short amount of time, such that keys are not stored directly within the smartcard (e.g., and thus are difficult to ascertain via the smartcard).

Other example embodiments are directed to personalized smartcards that operate according to approaches in which smartcards without a PUF feature are operated, such that an operator is prevented from learning secrets associated with the PUF of any individual smartcard. As well as bringing security benefits, this approach ensures that PUF-based smartcards can be introduced to an existing system without necessarily changing key management practices or EMM message structures already in use by the operator.

A variety of different types of PUF-type circuits may be implemented in accordance with one or more embodiments herein. Such a PUF circuit can be thought of as a "fingerprint" or other "biometric" of an integrated circuit. By analyzing properties of some physical structure on the device, a number of bits of information are derived which differ significantly from one device to the next due to processing variations encountered during manufacturing, even when devices are derived from the same processing batch.

Two such types of PUFs include an implicit (or intrinsic) type of PUF, and an explicit type of PUF. The implicit PUFs are based on measuring the behavior of a circuit component that is part of an overall circuit design, such as a cell or block that has other uses for which the circuit is employed. For example, the start-up state of static RAM cells or D-type flip-flops can be detected and used as a PUF. These components within a circuit offer largely consistent behavior at each power-cycle event, yet such components in different devices exhibit different behavior relative to one another. Explicit PUFs are based on one or more dedicated circuit blocks included with a circuit. These blocks are explicitly included for use as a PUF type circuit, and are thus selected based upon the circuit's ability to exhibit desirable "PUF-like" properties.

Both implicit and explicit PUFs can have, or can be converted to, one of two architectures including an output-only architecture, and an input-output architecture. The output-only architecture acts as a source of device-specific bits, which is converted (via suitable processing) into a form usable as a cryptographic key. The input-output architecture produces a device-specific output bitstring from a particular input bitstring. This output bitstring may also be implemented with a "cryptographic" function, in that it acts as a device-specific function which can be used to generate challenge-response pairs that differ from one device to the next, based upon the aforesaid implicit or explicit differences in the circuits. Output-only architectures can be converted to input-output architectures by using a cryptographic key derived from the device specific bits in conjunction with a block cipher or hash function. Accordingly, embodiments described herein in connection to an intrinsic, or implicit, PUF may be implemented using explicit PUFs.

Figure 1:
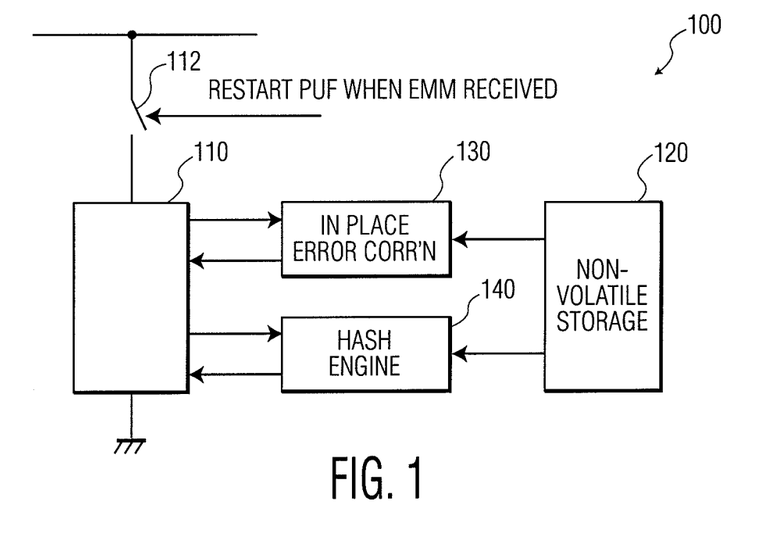
FIG. 1 shows a circuit for generating a PUF-type output used in cryptographic media content authorization, in accordance with an example embodiment of the present invention.

Turning now to the Figures, FIG. 1 shows a circuit 100 for generating a PUF-type output used in cryptographic media content authorization. The circuit 100 includes a PUF-type circuit 110 (e.g., a target circuit that generates a distinct output), such as an SRAM, which can be triggered into use whenever an EMM message addressed to the card (in which the circuit 100 is employed), or to a group within which that card sits, is received. The circuit 100 also includes a non-volatile memory circuit 120 for storing cryptographic data, an error correction circuit 130, and a hash engine 140. Where the PUF-type circuit 110 includes an implicit PUF that provides bits based on the start-up state of SRAM cells or flip-flop states, an internal switch 112 connects the PUF-type circuit to an external power supply (e.g., as supplied to a smart card in which the circuit 100 is implemented).

The circuit 100 can be operated in various fashions. In one implementation, the circuit 110 is implemented with an SRAM device, the contents of which are filled with device-specific bits upon start-up (or a power cycle) effected via the switch 112. Since these bits are subject to a certain level of uncertainty (e.g., observe an error rate of 5% to 10% as between successive power-up events, as about 5% to 10% of observed bits can different with the remainder being the same), an error correction process is carried out by storing, in the non-volatile memory 120, redundancy information associated with an error correcting code to be used on the device-specific bits. Once the device 100 has settled (e.g., circuits are up to a full power level after start-up), error correction circuit 130 reads the redundancy information from non-volatile memory 120 and corrects the actual PUF bits to a consistent codeword bits in-place within the SRAM. The locations of the PUF bits are not changed, with a small number of bits being modified by the error correction process. The hash engine 140 can perform operations upon a key recovered from the non-volatile memory 120, with information derived therefrom being erased by the iterative action of the hashing function, resulting in a short (e.g., ten-second) lifetime for data generated via the hashing function. This short lifetime makes it difficult for an attacker to access the information.

In some implementations, a power switch (such as switch 112) is used to iteratively cycle a PUF circuit in order to effect multiple initializations before any subsequent error correction is applied, which can simplify or completely eliminate the need for error correction. For instance, this approach can reduce the effective bit error probability for bits derived during operation compared to those derived at personalization time.

Once the corrected PUF bits are available, they can be utilized in a variety of ways. In one implementation, and referring to FIG. 2, a media access circuit 200 uses a corrected vector corresponding to the PUF bits as a cryptographic key that replaces a card key for a card in which the circuit 200 is employed. The circuit 200 includes a cryptographic circuit 210 (e.g., a data-generation circuit for generating data corresponding to a key), an error correction circuit 220 and a PUF circuit 230 (e.g., a target circuit that generates a distinctive signature output). Circuits 220 and 230 may be implemented using an approach such as that shown in FIG. 1. EMMs received at cryptographic circuit 210 are decrypted using a PUF-derived key generated by PUF circuit 230 and processed by error correction circuit 220, which uses redundancy data. This redundancy data is stored at a time of enrollment of the circuit (and personalization of the card), in which the PUF-derived key (or PUF-key PK) is exported from the card and stored for use in encrypting the EMM packets for that card, or is used to pre-encrypt future service keys that are to be used during the life of the card.

Figure 2:
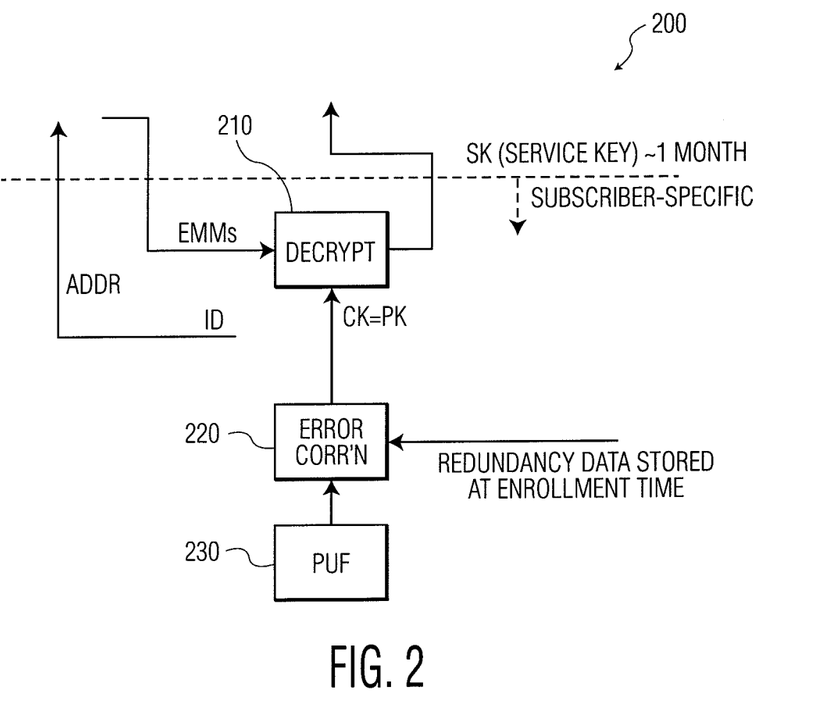
FIG. 2 shows a media access circuit that uses a corrected vector corresponding to PUF bits as a cryptographic key, in accordance with another example embodiment of the present invention.

The approach shown in FIG. 2 can be implemented, for example, with pay-TV systems having relatively small numbers of subscribers and in which direct addressing is possible within the available bandwidth. A corresponding smart card can be manufactured with a small amount of non-volatile memory needed to store the redundancy data for the error corrector.

Figure 3:
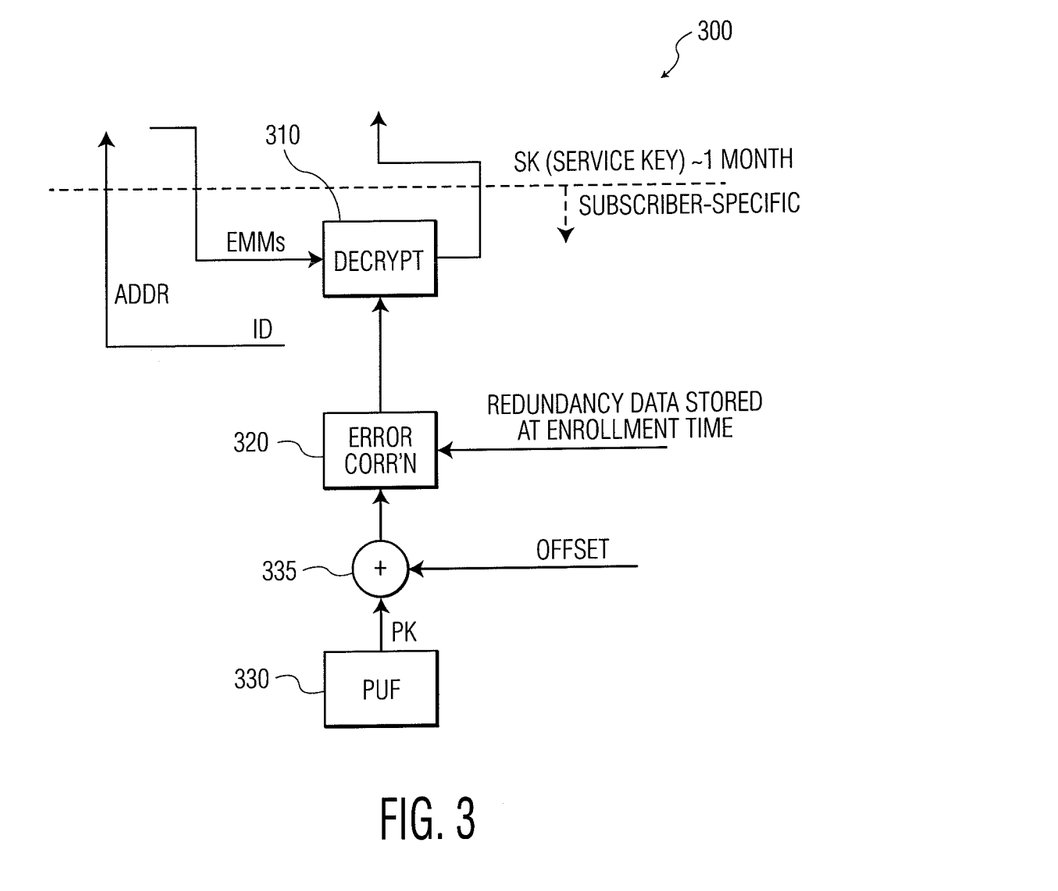
FIG. 3 shows another media access circuit in which PUF-generated data is used as an offset for a key used in controlling media content access, in accordance with another example embodiment of the present invention.

FIG. 3 shows another media access circuit 300, in which PUF-generated data is used as an offset for a key used in controlling media content access, in accordance with another example embodiment. The components in FIG. 3 are similar to those in FIG. 2 (and labeled with corresponding reference numbers), including a cryptographic circuit 310, error correction circuit 320 and PUF circuit 330, and further including an offset circuit 335 that facilitates the addition of a PUF-generated offset to a key. The PUF circuit 330 generates a value that is used as an offset between any card key (be it an individual key or a group key) and an actual cryptographic key employed.

Where used for a multitude of media subscribers, cards in which the circuit 300 is employed are provisioned with a key, which can be implemented in a manner similar to that in which no PUF is used, such as by distributing keys to many subscribers to a particular content set (e.g., a basic subscription set for a satellite television service). The offset circuit 335 facilitates the combination of PK<+>offset (where<+>denotes XOR), to generate an actual cryptographic key employed within a media delivery system. Thus, a common key (e.g., as used in group addressing, broadcast encryption or random pre-distribution) can be used, with each card having a different offset value stored instead of that key, depending on the value of its PUF.

This approach as shown in FIG. 3 can be implemented without necessarily changing a personalization phase, such as is relative to personalization for cards that do not include a PUF (e.g., facilitating retrofit applications). During this phase, the PUF is initialized within the card, which can be effected multiple times in order to refine the estimate of a "nominal" bit vector produced by the PUF, using majority logic. The relevant key is written into the card, and the circuit 300 computes the offset and stores the offset in its own non-volatile memory (e.g., as in 120). The PUF value or the offset used/stored within any individual card is not made available at this time, and no card stores the actual keys for EMM packet encryption stored within its non-volatile memory.

Figure 4A:
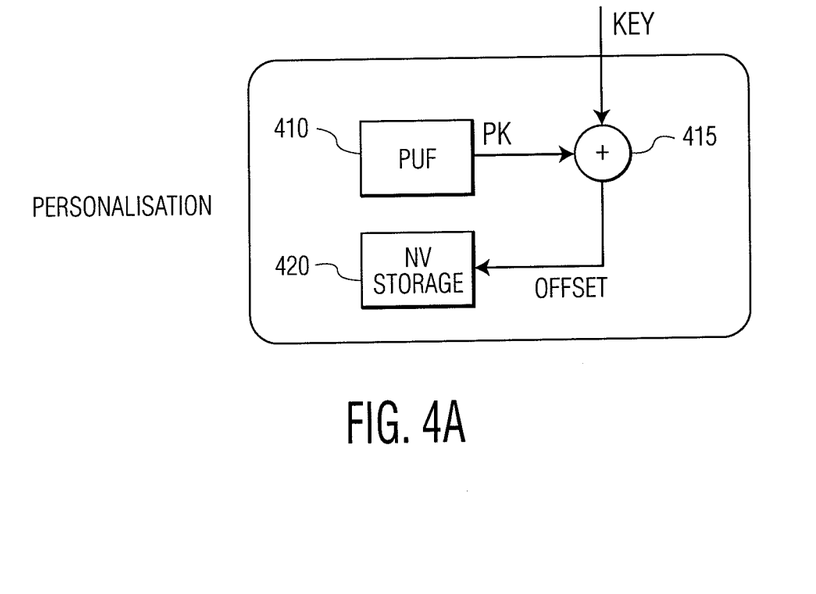
FIG. 4 shows a data flow for personalization and use of a smart card, in accordance with various example embodiments.
Figure 4B:
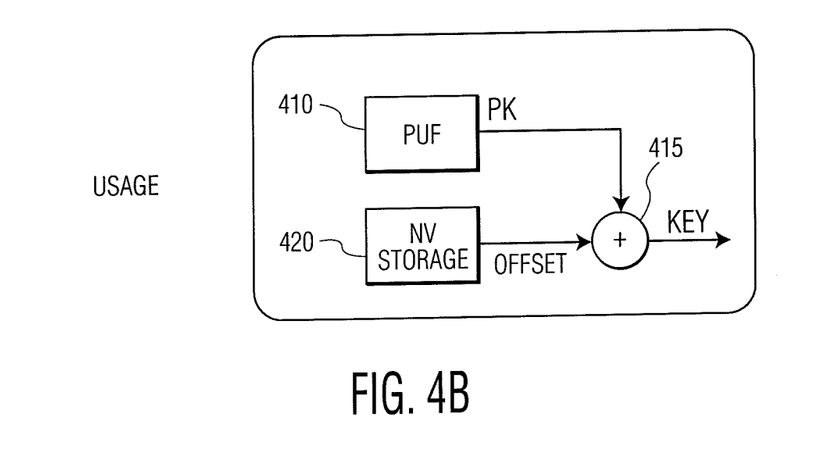

FIG. 4 shows a data flow for personalization and use of a smart card, in accordance with various embodiments. In FIG. 4A, a personalization phase is carried out in which PUF circuit 410 generates a PUF key, which is processed with a received key at 415 to create an offset value that is stored in memory 420. In FIG. 4B, a usage phase is carried out, in which PUF circuit 410 generates a PUF key, which is processed at 415 with the stored offset to provide the received key for use in media access.

As applicable to FIGS. 1-4 above and in various embodiments, a card in which a media access circuit is included, computes its own redundancy data for the vector which is the "target" of the XORing of offset<+>PUF, and storing it in non-volatile memory. Accordingly, the personalization phase can be implemented in a functionally similar manner as for a card without embedded PUF circuits as described herein.

In a more specific implementation, a card personalization process operates as follows. A nominal PUF vector PUF_nom is derived by majority logic applied to successive initializations of a PUF block. This vector can be considered as including two parts, $P_1$ and $P_2$, the separation between which is defined by the error correcting code chosen. Using the symbol ∥ to denote concatenation, the nominal PUF vector can be represented as $P_1 \| P_2$. The nominal PUF vector will not normally be a codeword of the error correcting scheme, and hence an offset value Δ (which is confined to the suffix or $P_2$ portion) can be computed such that $P_1 \| (P_2 <+> \Delta)$ would be a codeword.

For Both the supplied key K and the offset O, associated suffices $R_K$ and $R_O$, which make $K \| R_K$ and $O \| R_O$ codewords, are respectively computed. If a conventional, linear, error correcting code is used, in which the XOR of two codewords is also a codeword, as represented by:

$$P_1 \| (P_2 <+> \Delta) = (K <+> O) \| (R_K <+> R_O).$$

A vector X is stored such that PUF_nom<+>X=K∥$R_K$; in this way, when the vector X is XORed with the actual value recovered from the PUF in use, the resulting value is centered on the codeword containing the desired key. From the equa tion above, $X=O\|R_O<+>\Delta$. The inputs available for computing X are K, $P_1$ and $P_2$. Since $$P_1\|P_2=K<+>O\|R_K<+>R_O<+>\Delta,$$

Figure 5:
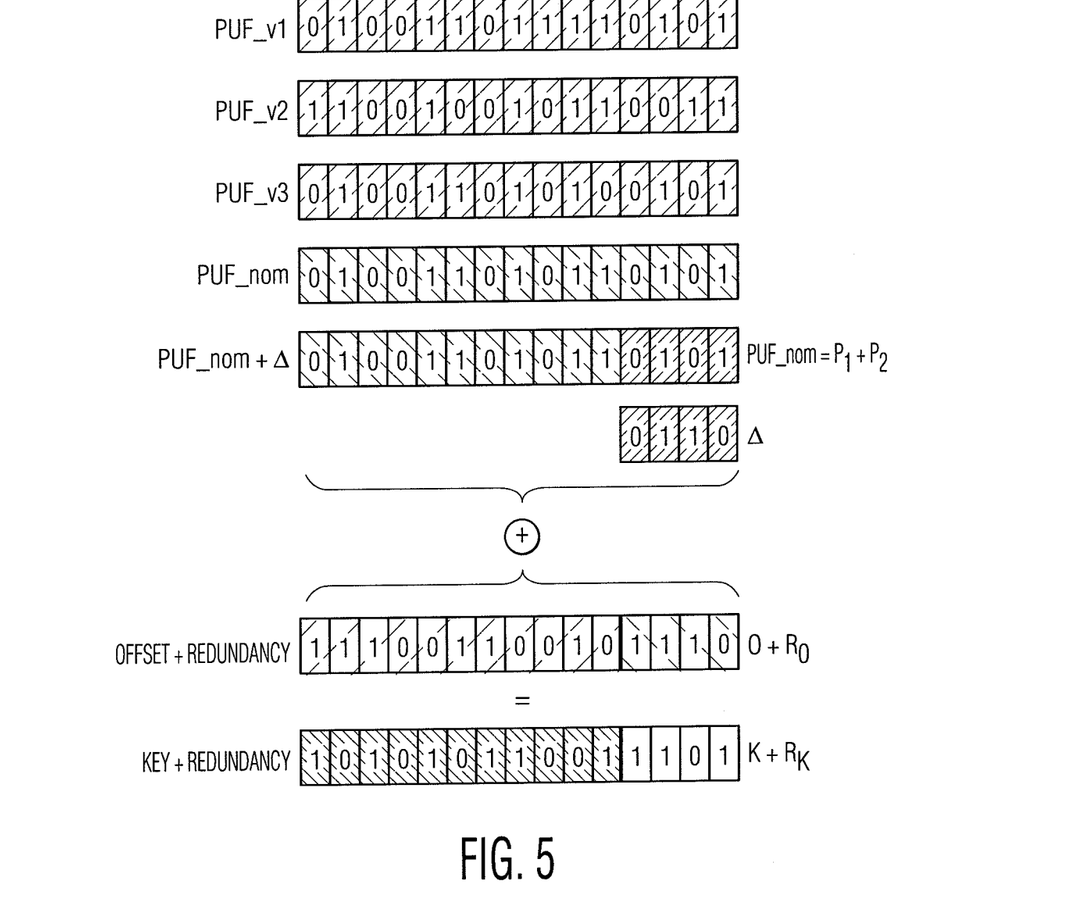
FIG. 5 shows exemplary data tables as may be stored and used in connection with one or more example embodiments.

$O=P_1<+>K$ and $R_O<+>\Delta=P_2<+>R_K$. The personalization is then implemented by storing $P_1<+>K$ and (if Suff( ) denotes the function which computes a suffix to construct a codeword) $P_2<+>$Suff(K). FIG. 5 shows exemplary data items as corresponding to the above, as may be implemented in accordance with one or more example embodiments as described herein.

Figure 6:
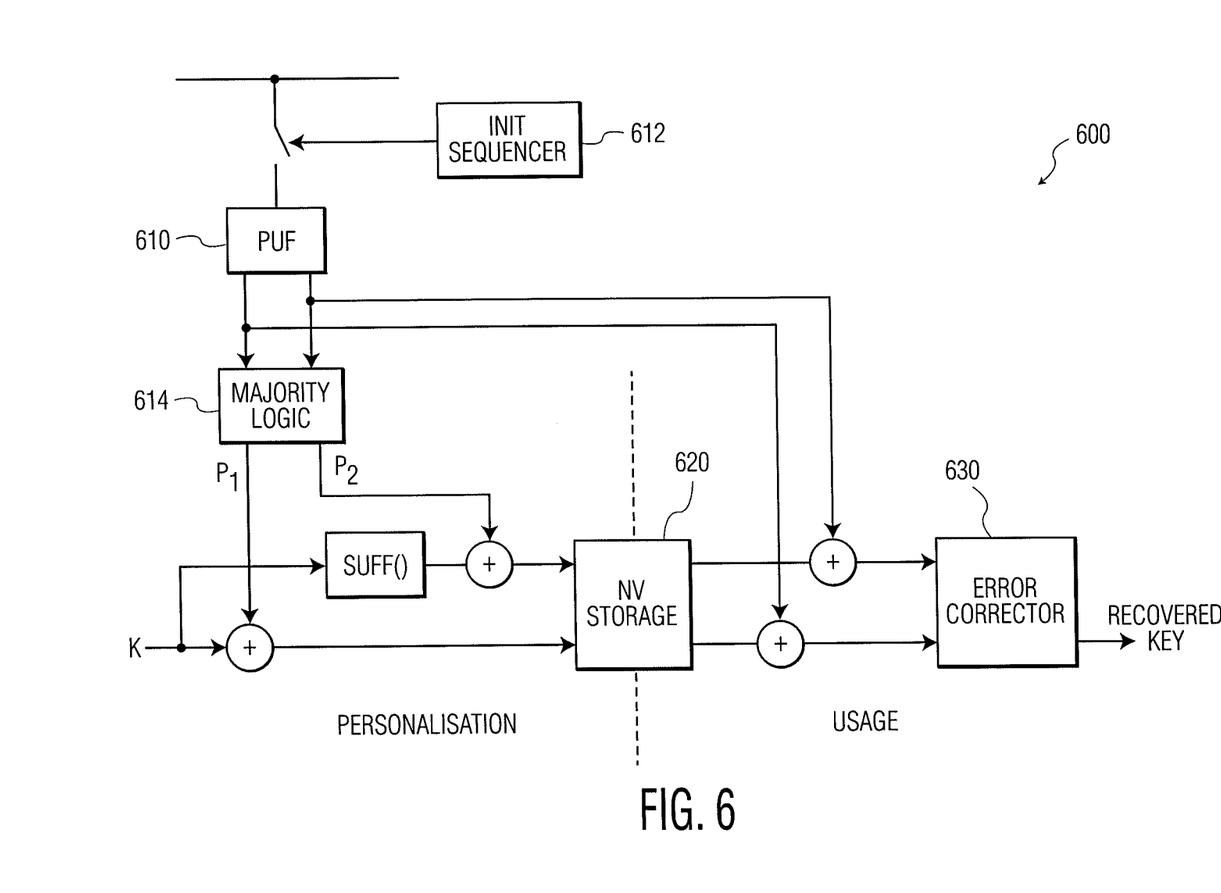
FIG. 6 shows an exemplary implementation of corresponding personalization and usage dataflows, as may be implemented with one or more embodiments.

FIG. 6 shows an exemplary implementation of corresponding personalization and usage dataflows, as may be implemented with one or more embodiments as described above. The implementation in FIG. 6 shows a PUF circuit 610, an initialization circuit 612 (for switching), majority logic 614, non-volatile storage 620 and an error corrector 630. When a PUF is used operationally to construct a required key in response to the receipt of an EMM packet, the output of the PUF is XORed with vectors recovered from NV-storage and the error corrector applied to the result. The codeword output from the error corrector is then truncated to recover the intended key. Since the PUF is switchable, multiple initializations and subsequent majority logic can also be used in the operational phase.

During the operational phase, other keys may be derived from the computed key using a one-way function (such as a hash function). When an SRAM is used as the PUF circuit, a hash engine can be directly connected to the SRAM as shown in FIG. 1, such that subsequent one-way function computations can be directly performed on the recovered key in place within that memory. In this way, secrets that are derived from the PUF circuit and the recovered key are directly erased by the iterative action of the hashing function, so that they persist in memory for a short time.

Based upon the above discussion and illustrations, those skilled in the art will readily recognize that various modifications and changes may be made to the present invention without strictly following the exemplary embodiments and applications illustrated and described herein. For example, various embodiments as described herein may be used in a variety of different types of applications, such as in pay-TV systems associated with satellite, cable or terrestrial broadcasting, and with conditional access systems such as those used within DVB-H broadcasting to mobile devices (e.g., mobile telephones). Such modifications do not depart from the true spirit and scope of the present invention, including that set forth in the following claims. Furthermore, the term "example" as used throughout this document is by way of illustration, and not limitation.

What is claimed is:

1. An apparatus comprising:
    a target circuit configured and arranged to generate a cryptographic key and first and second outputs indicative of a distinctive manufacturing-based signature that identifies the target circuit;
    a data-generation circuit configured and arranged to
        generate an offset based on the cryptographic key, the first output of the target circuit, and parts of a vector corresponding to the distinctive manufacturing-based signature,
        use the offset and the second output that is generated by the target circuit, the second output being different than the first output and being indicative of the distinctive manufacturing-based signature, to generate data that corresponds to the cryptographic key that was used to generate the offset; and
    an interface circuit configured and arranged to communicate with a media decoding device for receiving the cryptographic key from the media decoding device, and
    wherein the data-generation circuit is further configured and arranged to
        after generating the offset, erasing the cryptographic key,
        after erasing the cryptographic key, generate data by regenerating the cryptographic key by XORing the offset with the second output generated by the target circuit, and
        decrypt a control word using the regenerated cryptographic key and provide the decrypted control word to the media decoding device via the interface.

2. The apparatus of claim 1, wherein
    the target circuit is a physically unclonable function (PUF) circuit configured and arranged to generate an output indicative of a distinctive manufacturing-based characteristic of the PUF circuit, the distinctive manufacturing-based characteristic of the PUF circuit being different for different PUF circuits manufactured with the same components, and
    the offset, O, is further defined by an equation $P_1\|(P_2<+>\Delta)=(K<+>O)\|(R_K<+>R_O)$, where K is the cryptographic key, P1 and P2 are two parts of a vector, a separation P1 and P2 is defined by an error correcting code, $\|$ denotes concatenation, $<+>$ denotes XOR, and $R_K$ and $R_O$ are suffices associated with O and K which make $K\|R_K$ and $O\|R_O$ codewords.

3. The apparatus of claim 1, further including an offset circuit configured and arranged to combine a PUF key and the offset to generate the cryptographic key, wherein the cryptographic key, PK, is defined by an equation PK$<+>$offset, where $<+>$ denotes XOR, and
    wherein the data-generation circuit is configured and arranged to use the generated data that corresponds to the cryptographic key to generate and output decoding data.

4. The apparatus of claim 1, further including an error correction circuit configured and arranged to process the second output of the target circuit to correct errors therein, and to provide the processed second output to the data-generation circuit for use in generating the offset and generating the data.

5. The apparatus of claim 1, further including a power circuit configured and arranged to interrupt power to the target circuit, after the target circuit generates the first output, to cause the target circuit to generate the second output indicative of a distinctive manufacturing-based signature that identifies the target circuit for use by the data-generation circuit in generating the data.

6. The apparatus of claim 1, wherein the offset, O, is defined by an equation $P_1\|(P_2<+>\Delta)=(K<+>O)\|(R_K<+>R_O)$, where K is the cryptographic key, P1 and P2 are two parts of a vector, a separation P1 and P2 is defined by an error correcting code, $\|$ denotes concatenation, and $R_K$ and $R_O$ are suffices associated with O and K which make $K\|R_K$ and $O\|R_O$ codewords.

7. The apparatus of claim 6, wherein the cryptographic key, K, is defined by an equation PUF_nom$<+>X=K\|R_K$, where X is a vector, PUF_nom is an actual value recovered from a PUF circuit in use, $\|$ denotes concatenation, and $<+>$ denotes XOR.

8. The apparatus of claim 1, further including an offset circuit configured and arranged to combine a PUF key and the offset to generate the cryptographic key, wherein the cryptographic key, PK, is defined by an equation PK$<+>$offset, where $<+>$ denotes XOR.

9. A method for generating data corresponding to a cryptographic key, the method comprising:
  using a target circuit, generating a first output indicative of a distinctive manufacturing-based signature that identifies a target circuit;
  generating an offset based at least partly on the cryptographic key, the first output, and parts of a vector corresponding to the distinctive manufacturing-based signature;
  using the target circuit, generating a second output that is indicative of the distinctive manufacturing-based signature;
  using the offset and the second output, generating data that corresponds to the cryptographic key that was used to generate the offset;
  communicating with a media decoding device for receiving the cryptographic key from the media coding device, wherein generating an offset includes generating the offset based partly on the received cryptographic key;
  after generating the offset, erasing the cryptographic key;
  after erasing the cryptographic key, generating data by regenerating the cryptographic key by XORing the offset with the second output generated by the target circuit; and
  decrypting a control word using the regenerated cryptographic key and providing the decrypted control word to the media decoding device.

10. The method of claim 9, wherein generating an output using the target circuit includes generating, at a physically unclonable function (PUF) circuit, an output indicative of an unclonable characteristic of the PUF circuit.

11. The method of claim 9,
  further including processing the outputs of the target circuit to correct errors therein and therein provide error-corrected outputs,
  wherein generating an offset includes using an error-corrected output of the target circuit, and
  wherein generating data includes using the offset and another error-corrected output of the target circuit.

12. A media access system comprising
  a media decoding device configured and arranged to receive an encrypted media stream and to decrypt the media stream; and
  a media access card including
    a communication interface configured and arranged to communicate with the media decoding device,
    a physically unclonable function (PUF) circuit configured and arranged to generate an output indicative of an unclonable characteristic of the PUF circuit, and
    a cryptographic circuit configured and arranged to
      control the PUF circuit to generate an output, generate a key offset using the output of the PUF circuit, a key provided to the cryptographic circuit, and parts of a vector corresponding to the distinctive manufacturing-based signature, and store the key offset in a memory circuit, and
      after storing the key offset, erase the key provided to the cryptographic circuit, operate the PUF circuit to generate a new output different from the output, use the new output with the stored key offset to obtain the key by XORing the key offset with the output of the PUF circuit, and use the obtained key to facilitate the decryption of media content at the media decoding device.

* * * * *